No. 695,707. Patented Mar. 18, 1902.
O. T. BUGG, Jr.
ELECTRICAL STORAGE BATTERY.
(Application filed July 19, 1900.)
(No Model.)
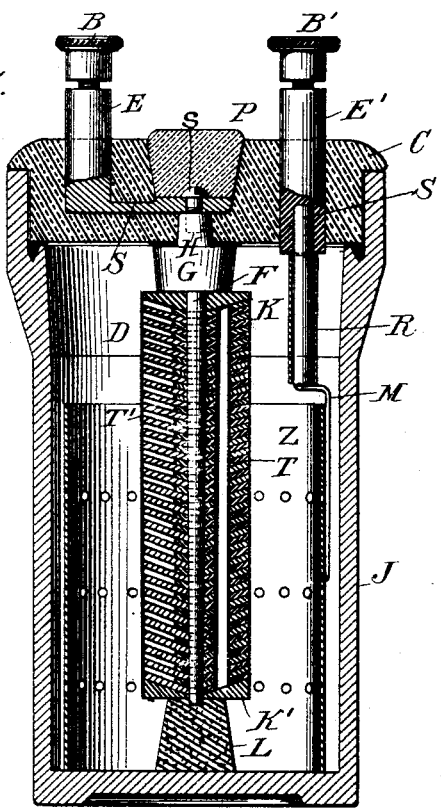
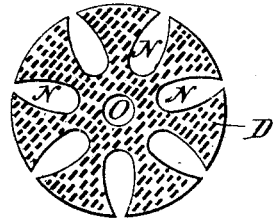
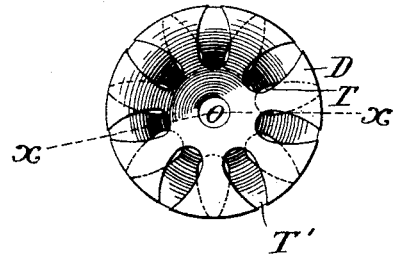
Witnesses
Edward C. Howland
M. F. Keating
Inventor
Owen T. Bugg Jr
By his Attorney
Charles J. Kintner
THE NORRIS PETERS CO., PHOTO-LITHO., WASHINGTON, D. C.

UNITED STATES PATENT OFFICE.

OWEN T. BUGG, JR., OF NEW YORK, N. Y., ASSIGNOR TO THE UNITED STATES BATTERY COMPANY, OF NEW YORK, N. Y.

ELECTRICAL STORAGE BATTERY.

SPECIFICATION forming part of Letters Patent No. 695,707, dated March 18, 1902.

Application filed July 19, 1900. Serial No. 24,164. (No model.)

*To all whom it may concern:*

Be it known that I, OWEN T. BUGG, Jr., a citizen of the United States, residing at New York, in the county of Kings, borough of Brooklyn, and State of New York, have made a new and useful invention in Electrical Storage Batteries, of which the following is a specification.

My invention has for its object to provide means for securing the terminals of a storage battery to the lid or cover of the cell in such manner that the entire structure may be readily taken apart and again put together without materially changing the relative positions of the electrodes when reassembled.

For a full understanding of the invention, such as will enable others skilled in the art to construct the same, reference is had to the accompanying drawings, in which—

Figure 1 is a full-sized sectional view of one cell of my novel form of storage battery, parts of the structure being illustrated in elevational view. Fig. 2 is an enlarged plan view of the under surface of one of the plates, which when assembled compose the negative electrode. Fig. 3 is an enlarged plan view as seen looking at the top of the negative electrode, illustrating the relative arrangement of the successive cup-shaped plates, the supporting standard or stem, however, being removed.

Referring now to the drawings in detail, in all of which like letters of reference represent like parts wherever used, J represents a containing jar or vessel, and C the cover thereof.

Z is an amalgamized zinc plate of cylindrical form, perforated, as shown, and fitting snugly within the interior surface of the vessel, said plate constituting the positive electrode of the cell.

The negative electrode consists of a series of lead plates D, preferably cylindrical in form, perforated at their centers, as shown at O in Fig. 2, and either corrugated or indented, so as to roughen their surfaces, and thereby increase their superficial area. Each of these plates is provided with a series of radially-disposed slots N N N of practically elliptical form and converging, as shown, at their outer ends, near the periphery thereof, the outer openings of the slots being preferably each about one-fortieth of the outer circumference of the plate. After these plates are constructed as described they are subjected to pressure in a die or mold in such manner as to give to them a conical or cup shape, as shown.

F represents a standard or stem, preferably of lead, tapered, as shown, and having cast integrally therewith an enlargement G and a tapered lug or extension H, adapted to serve as the stem by which the negative electrode is secured to the conducting-terminal in the lid or cover C.

K represents a lead disk cone-shaped on one side, as shown, and adapted to fit accurately around the enlarged tapered base of the standard F and against the face of the enlargement G.

In assembling the cup-shaped plates D the standard or stem F is inverted and the tapered disk K forced firmly into the position shown, after which the plates D are slipped into position in succession, said plates being so rotated or arranged relatively to each other that the enlarged outer ends between the consecutive slots N N N of one plate lie immediately over the slots of the plate immediately below it. After all of the plates are thus put in position a second disk K', the reverse in shape of the disk K, is slipped into place about the smaller end of the standard or stem F, and all of said parts are firmly secured together, either by riveting, lead-burning, or otherwise securing the end of the standard or stem to the disk K'. With such an arrangement of plates having slots N there is formed a radial series of pockets having outer openings T' T' for admitting the free circulation of the electrolyte and a corresponding vertical series of channels or openings *t t*, extending continuously through the electrode on all sides of the standard or stem F, as will be apparent on inspection of Figs. 1 and 3 of the drawings, it being understood that the sectional view of the electrode in Fig. 1 is taken on the broken line *x x*, Fig. 3.

L represents a cork or other insulating medium adapted to form a mechanical connection between the lower end of the negative electrode and the bottom of the jar or vessel K, said cork being preferably secured thereto by cement.

E represents one of the conducting-terminals of the negative electrode and is constructed of cast metal, having secured in its outer end a screw-threaded brass pin for receiving the binding-nut B, its lower end having an integral flat angular arm S, to which the electrode is secured by a screw s, extending into the stem H. E' represents the other conducting-terminal, having a brass screw-pin secured in its upper end for the binding-nut B' and a metal terminal S' similarly secured in its lower end, to which is secured in turn in any preferred manner a thin flat copper extension M, adapted when in position to pass between the the zinc electrode Z and the inner wall of the jar or vessel J, said terminal being amalgamated and not adapted to act in any sense as an electrode, but merely as a conductor between the zinc electrode and the terminal E'.

R is a rubber sleeve adapted to insulate the metallic part S' of the terminal when the electrolyte is in place in the jar or vessel.

One of the essential features of my invention consists in assembling the terminals E E' and their adjacent parts in a definite position relative to each other and then casting or molding therearound the lid or cover C of acid-proof and insulating material, such as vulcanized rubber or the like, P being a plug of fusible material which may be readily removed on the application of heat, so as to enable one to have access to the sustaining-screw s, whereby the negative electrode may be disconnected from the lid or cover, as will be understood on inspection of Fig. 1 of the drawings. The lower surface of this lid or cover C is adapted when in position to rest above or upon a ledge within the inner surface of the jar or vessel in which is secured an oil or other insulating medium, as shown.

I do not limit myself to the especial details of construction herein shown and described, either with relation to the novel form of negative electrode or to the particular arrangement of terminals when permanently connected to or secured in the cover of a battery-cell, as these features may be departed from in many respects without avoiding my claims hereinafter made.

Having thus described my invention, what I claim, and desire to secure by Letters Patent of the United States, is—

1. An electric battery having one electrode and its terminal secured directly to the lid or cover thereof, said electrode consisting of a series of cup-shaped plates secured together upon a supporting standard or stem and so arranged relatively to each other that free circulation of an electrolyte is afforded therethrough in all directions, said battery having the other electrode carried or supported within the interior of the containing jar or vessel and a second terminal secured directly to the lid or cover and adapted to form electrical connection with the last-named electrode when the lid or cover is secured in place, substantially as described.

2. An electric battery having its terminals permanently secured in the lid or cover thereof, an electrode secured to one of said terminals and composed of a series of slotted plates secured upon a supporting standard or stem, said plates being so arranged that the slots in any one plate do not exactly register with the slots in the plates immediately above or below, and the second electrode in frictional engagement with said second terminal, substantially as described.

3. An electric battery having both its terminals permanently secured to the lid or cover thereof, an electrode secured to one of said terminals and consisting of a series of plates slotted radially and mounted upon a supporting standard or stem, said slots being elliptical in form, and a second electrode fitting snugly within the inner surface of the containing jar or vessel, said second electrode being in frictional engagement with said second terminal, substantially as described.

4. An electric battery having both its terminals permanently connected to the lid or cover thereof, an electrode secured to one of said terminals and consisting of a series of cup-shaped plates slotted radially and mounted upon a supporting standard or stem, said slots being elliptical in form, said plates being so arranged upon the stem that the slots in any plate do not register with the slots in the plates immediately above or below, whereby pockets for the active material are formed, and a second electrode fitting snugly within the inner surface of the containing jar or vessel, said second electrode being in frictional engagement with said second terminal, substantially as described.

In testimony whereof I have hereunto subscribed my name this 11th day of June, 1900.

OWEN T. BUGG, Jr.

Witnesses:
C. J. KINTNER,
M. F. KEATING.